Figure 1:
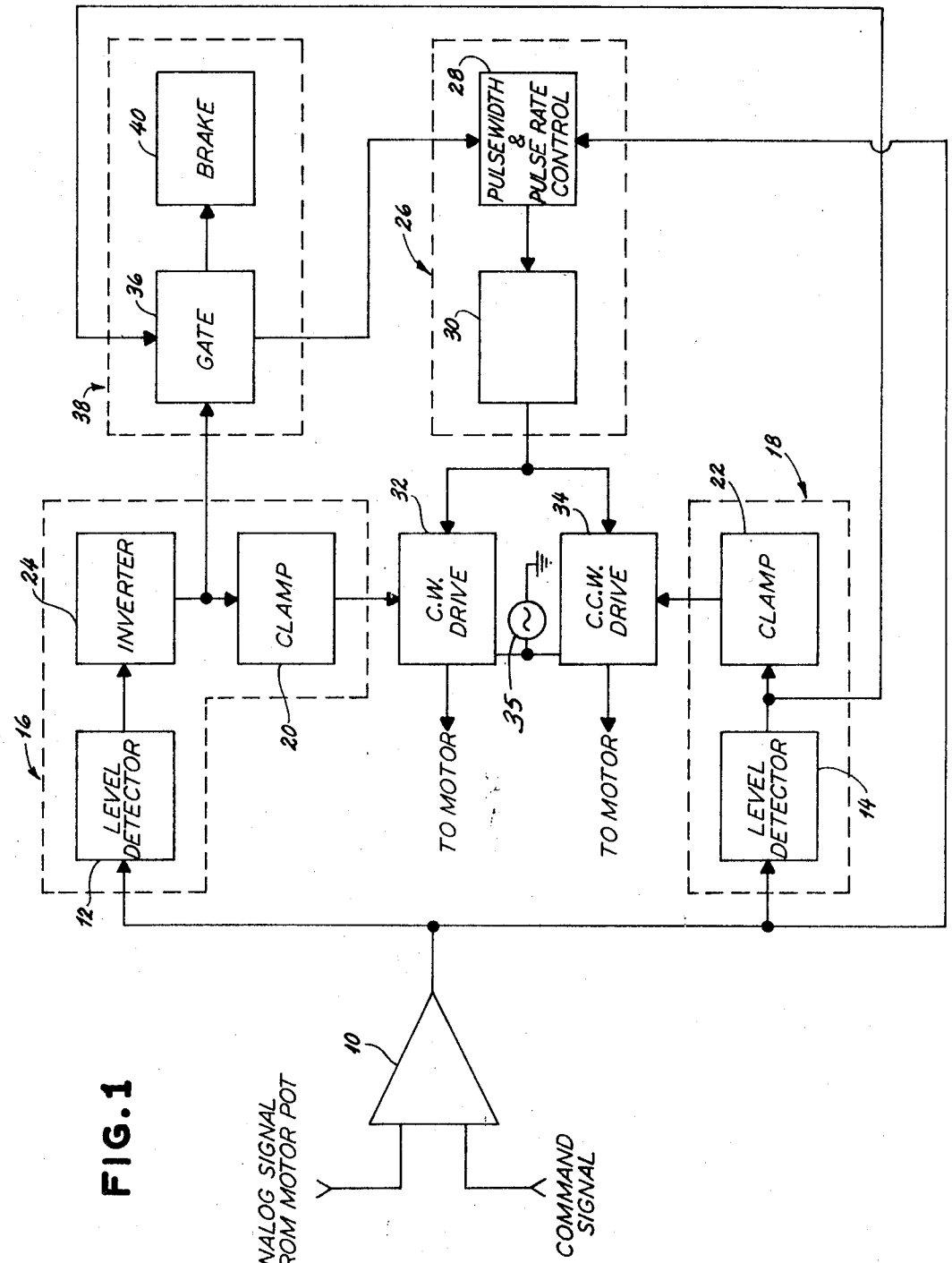

United States Patent
Bordonaro

[15] 3,652,912
[45] Mar. 28, 1972

[54] MOTOR CONTROLLER
[72] Inventor: Michael P. Bordonaro, Middletown, Conn.
[73] Assignee: Combustion Engineering, Inc., Windsor, Conn.
[22] Filed: Dec. 22, 1969
[21] Appl. No.: 887,156

[52] U.S. Cl. ........................318/599, 318/612, 318/681
[51] Int. Cl. .............................G05f 1/08, G05b 5/01
[58] Field of Search ................318/599, 681, 227, 612

[56] References Cited

UNITED STATES PATENTS

| | | | |
|---|---|---|---|
| 3,445,742 | 5/1969 | Moscardi | 318/599 X |
| 3,523,228 | 8/1970 | Currie et al. | 318/681 X |
| 3,525,029 | 8/1970 | Joslyn et al. | 318/599 |
| 3,536,980 | 10/1970 | McKenzie | 318/227 |

Primary Examiner—Benjamin Dobeck
Attorney—Fishman and Van Kirk, Carlton F. Bryant, Eldon H. Luther, Robert L. Olson, John F. Carney, Richard H. Berneike, Edward L. Kochey, Jr. and Lawrence P. Kessler

[57] ABSTRACT

A polyphase bidirectional control system suitable for use with AC motors of the squirrel cage type. In response to applied actual and desired position signals, the present invention generates a position error signal and a motor speed control signal; the speed control signal having a variable pulse width and pulse repetition rate. The control signal is employed to supervise the application of power to the motor to be controlled while the position error signal is employed to control the direction of operation of the motor.

15 Claims, 2 Drawing Figures

INVENTOR
MICHAEL P. BORDONARO

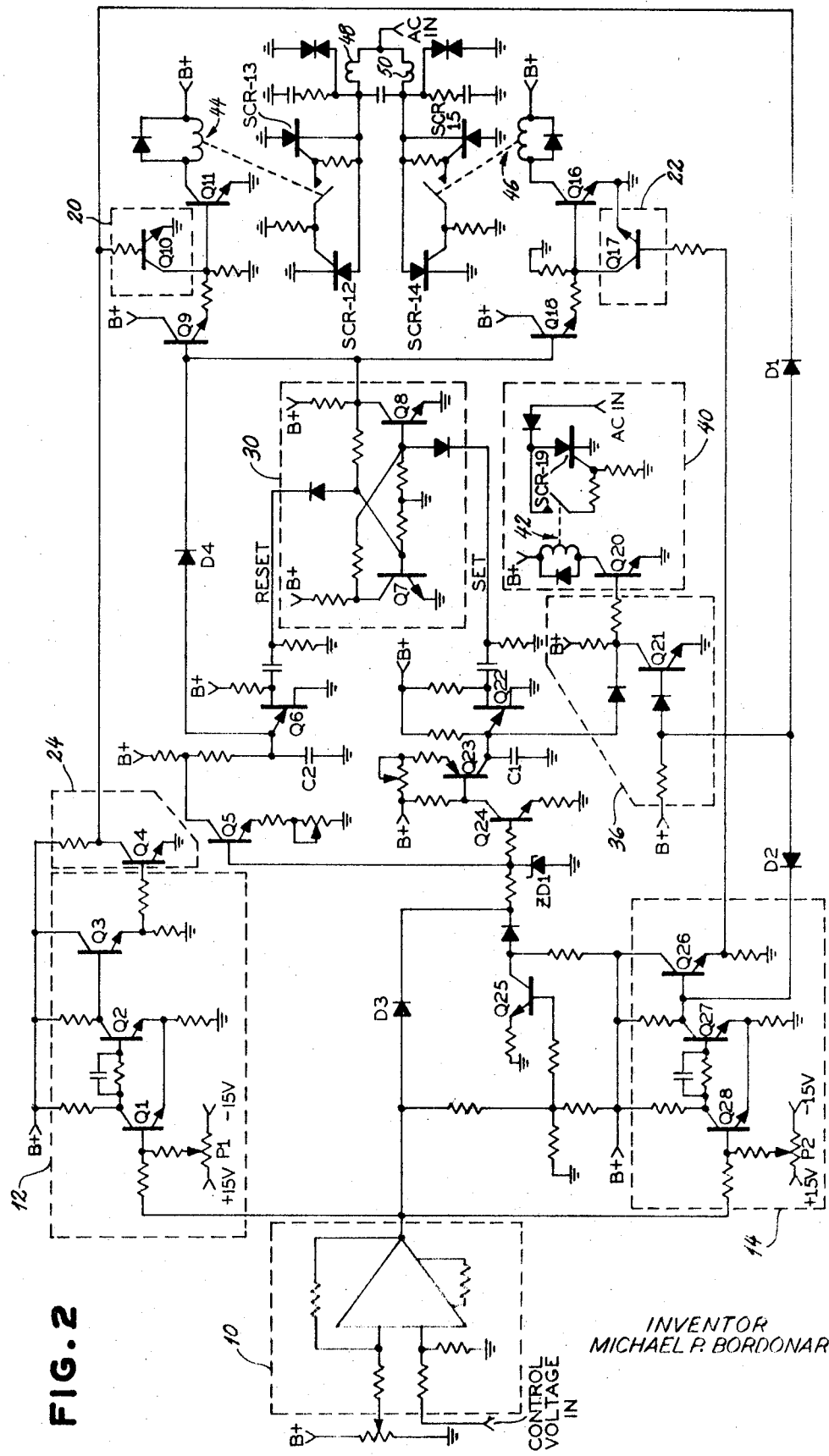

MOTOR CONTROLLER

The present invention relates to the control of electrical actuators. More specifically, the present invention is directed to a polyphase, bidirectional motor control system. Accordingly, the general objects of the present invention are to provide novel and improved methods and apparatus of such character.

While not limited thereto in its utility, the present invention has been found to be particularly well suited to driving alternating current motors of the split cage type. Such motors, commonly known as squirrel cage motors, are attractive for many applications due to their relatively inexpensive nature. However, prior art attempts to exercise control over squirrel cage motors have been notoriously unsuccessful and typically have resulted in inaccurate positioning and substantial hunting associated with overshoot.

As is well known, when employed as an actuator, an electric motor requires two sets of input relay contacts so as to enable the motor to be operated either clockwise or counter-clockwise. In view of the requirement for three modes of operation; off, clockwise drive and counterclockwise drive; an electric motor employed as an actuator cannot be driven directly from a conventional analog controller which has only one output channel. Attempts have been made to apply the output of an analog controller to devices known as pulse duration controllers which provide a pair of output signals; one output signal being associated with each direction of position error. Prior art pulse duration controls have, however, been characterized by uneven and inaccurate operation resulting from overshoot and associated hunting. The overshoot associated with prior art pulse duration controls may be attributed to the combination of momentum and exercise of control over pulse width only.

The present invention overcomes the above-discussed and other disadvantages of the prior art by providing a novel and improved motor controller characterized by variation of both pulse repetition rate and pulse width. Accordingly, in contradistinction to the prior art wherein only pulse width was controlled, the present invention provides for smoother operation and greater accuracy due to the greatly reduced chance of overshoot.

In accomplishing the foregoing, the present invention employs differential amplifier means, responsive to input signals commensurate with actual and desired position, for generating signals having a magnitude and polarity indicative of amount and direction, respectively, of position error of the device operated by the motor to be controlled. The error signal is applied to level detector means which, in response thereto, enables the proper one of a pair of drive circuits; there being a separate drive circuit for counterclockwise and clockwise operation of the motor. The error signal is also applied to pulse generating and shaping circuitry wherein a pulsating control signal having a pulse repetition rate and pulse duration proportional to error signal magnitude is generated. The pulsating control signal is applied to means for gating AC power to the motor via the enabled one of the motor drive circuits whereby the motor will be driven in the proper direction to null the position error of the device operated thereby. As the position error is reduced, the width of the control pulses will simultaneously be reduced while the pulse repetition rate of the control signal will be decreased. The simultaneous variation of pulse duration and repetition rate results in extremely smooth operation and practically no overshoot.

The present invention also comprises brake control means which controls the application of braking force to the motor while simultaneously disabling the control pulse generating means during periods when the error signal provided by the differential amplifier means falls within a preselected deadband. The incorporation of the brake control means, in combination with the variation of both pulse repetition rate and pulse width, enables the present invention to be utilized to control split cage AC motors with overhanging loads. As noted above, there has not previously been a control technique which enabled the use of the split case motor as an electrical actuator, with or without overhanging loads.

The present invention may be better understood and its numerous objects and advantages will become apparent to those skilled in the art by reference to the accompanying drawing wherein like reference numerals refer to like elements in the two figures and wherein:

FIG. 1 is a block diagram of a preferred embodiment of the present invention; and FIG. 2 is a schematic diagram of the embodiment of FIG. 1.

With reference now to FIG. 1, an input command signal in the form of a DC voltage level is applied as a first input to a differential amplifier 10. The command or set point signal may be provided by an equipment operator or a suitable sensor and associated computation circuitry. An analog feedback signal from a suitable sensing device associated with the motor being controlled or the apparatus which is operated thereby, the feedback signal being indicative of instantaneous actual position, is applied as a second input to differential amplifier 10.

Differential amplifier 10; which by way of example may comprise a Nexus SQ-10A amplifier available from Nexus Research Laboratories, Inc., Canton, Massachusetts; subtracts the feedback signal from the command signal to provide a position error signal having a magnitude and polarity commensurate with the direction and distance a motor being controlled should be operated in order to bring the motor output shaft or device operated thereby to the desired position.

The error signal provided by differential amplifier 10 is applied as the input to level detectors 12 and 14. Level detectors 12 and 14 respectively function as the input stages of direction control circuits 16 and 18. In the manner to be described below, level detectors 12 and 14 sense the polarity of the error signal and, depending upon the direction of the error, one of a pair of associated clamp circuits 20 and 22 will be energized. The turn-on point of level detectors 12 and 14 is offset to provide a deadband for the purposes to be described below. It is also to be noted that in order to provide signals of the proper polarity for energizing clamp circuit 20, the clamp circuits and other circuitry to be described below all operating with inputs of the same polarity, it is necessary to invert the output signal of level detector 12. For this purpose, the directional control 16 also includes an inverter circuit 24 connected between level detector 12 and clamp circuit 20.

The output of differential amplifier 10 is also applied as an input to control pulse generating circuitry indicated generally at 26. The control pulse generating circuitry 26 includes a pulse width and repetition rate control 28 and a pulse shaping circuit 30. As will be described in greater detail below, control 28 includes clock or pulse generation circuitry and means for controlling both the repetition rate and width of the pulses provided at the output of circuitry 26.

The control pulses provided by control pulse generating circuitry 26 are applied to motor drive circuits 32 and 34. Drive circuit 32 comprises the clockwise drive circuit while drive circuit 34 comprises the counterclockwise drive circuit. The outputs of clamp circuits 20 and 22 are also respectively applied as inputs to drive circuits 32 and 34. The absence or presence of a clamp input to drive circuits 32 and 34 determines whether the driver circuits will accept or reject the drive control pulses provided by the pulse generation circuitry 26. Considering the example where clamp circuit 20 receives an input from level detector 12 via inverter 24, the clamp circuit will disable drive circuit 32, and drive circuit 34 will accordingly accept the control pulses from circuitry 26.

Drive circuits 32 and 34 each comprise switching means which, in response to the receipt of control pulses, will cause the application of AC power from an available local source 35 to the motor to be controlled. Accordingly, the motor armature will be supplied with pulses of AC power of variable width and repetition rate. The energization mode of the clamp controlled drive circuits will, of course, cause the motor to rotate in the proper direction to null the position error.

The output of level detector 14 and the inverted output of level detector 12, in addition to being applied to respective clamp circuits 22 and 20, are also applied as inputs to a circuit 36 which forms part of an on-off control 38. When the error signal from amplifier 10 is within the previously described deadband established by proper adjustment of level detectors 12 and 14, gate circuit 36 will assume a first condition whereby a brake control 40 will be deenergized and the motor brake set. Under these conditions, the output of gate circuit 36 will also be applied as a disabling input to the clock generator in control pulse generation circuitry 26. The function of the gate signal is to disable the clock in pulse generator 28 thereby preventing the generation of motor speed control signals. When the position error signal is outside of the deadband, gate circuit 36 will change state thereby energizing the brake coil and releasing the brake. The switching of gate circuit 36 will also remove the disabling signal from the clock in circuit 28 and speed control signals will be generated.

The actual construction and operation of the embodiment of FIG. 1 may be better understood from a consideration of FIG. 2 which comprises a schematic drawing of the embodiment of FIG. 1 as comprised of discrete, rather than integrated, circuit components. The output signal provided by differential amplifier 10 is applied to the base of input transistors Q1 and Q28 respectively of level detectors 12 and 14. The level detectors are state-of-the-art circuitry with each employing a detector stage and an emitter follower output stage. Considering level detector 12, the detector stage comprises a Schmidt trigger circuit including transistors Q1 and Q2 and an output emitter follower stage Q3. Level detector 14 similarly comprises a Schmidt trigger including transistors Q28 and Q27 and an emitter follower output transistor Q26. It is to be noted that the bias on the base of the level detector input transistors Q1 and Q28 is respectively adjusted via potentiometers P1 and P2 which are connected across a +15 to −15 volt source. By properly setting the movable arms on potentiometers P1 and P2, level detectors 12 and 14 may be made responsive to opposite polarity input signals. A deadband will also be selected intermediate the conduction potentials for transistors Q1 and Q28. The selection of a deadband is in the interest of preventing the control of the present invention from being responsive to noise or transients which may appear at the output of amplifier 10.

The output from emitter follower Q3 of level detector 12 is applied at the base of transistor Q4 which comprises inverter 24. The collector of inverter transistor Q4 is coupled to the base of clamping transistor Q10 of clamp circuit 20. Similarly, the output taken from emitter follower Q26 of level detector 14 is applied to the base of clamping transistor Q17 of clamp circuit 22. Accordingly, the polarity of the error signal provided by amplifier 10, through the action of the level detectors, switches either of clamping transistors Q10 or Q17 thus providing directional control in the manner to be described below.

The collector of transistor Q4 of inverter 24 and the collector of transistor Q27 of detector 14 are both coupled, via respective diodes D1 and D2 to the base of gate transistor Q21 of the gate 36 in the on-off circuit 38. When the error signal is within the deadband generated by the setting of potentiometers P1 and P2 in the level detectors, Q21 will be turned on. Conduction of gate transistor Q21 will lower the bias at the base of brake solenoid control transistor Q20 in brake control 40 whereby Q20 will become nonconductive and the brake control solenoid 42 unlatched. The unlatching of the brake control solenoid opens its contacts to the position shown thereby removing the gate drive from SCR 19 and allowing SCR 19 to turn itself off. The turning off of SCR 19 deenergizes the brake coil, not shown, which is in series therewith and sets the motor brake.

As will be described in greater detail below, with gate transistor Q21 in the "on" condition, the pulse or clock generator comprising unijunction transistor Q22 is disabled by virtue of its emitter being connected substantially to ground via Q21. Restated, conduction of transistor Q21 prevents capacitor C1 from charging to a voltage level which is above the firing potential of unijunction transistor Q22. Conversely, when the error signal is outside of the deadband Q21 will be in the nonconductive state and C1 will be able to charge sufficiently to fire Q22. Also, with Q21 nonconductive, Q20 will again be turned on latching the brake control solenoid 42 and firing SCR 19. With SCR 19 turned on, the brake coil will be energized thus releasing the brake.

The error signal appearing at the output of differential amplifier 10 is also applied to the control pulse generation circuitry. As noted above, the pulse generator comprises unijunction transistor Q22 which, along with the pulse rate control circuitry comprising Q23 and Q24, generates a signal having a pulse repetition rate which is directly proportional to the error signal magnitude. Negative error signals are applied to the pulse rate control circuit via inverter transistor Q25 and diode D3. Q25 inverts negative error signals so that the input to the pulse control circuitry will always be positive regardless of the polarity of the error signal. In the case of a positive error, the error signal will bypass Q25 via diode D3; Q25 being conductive and shunting current from the 15 volt source. With a negative error signal appearing at the output of amplifier 10, Q25 will be nonconductive and current will flow from the source to ground via diode D3 and rate control transistor Q24.

The rate control circuit, comprised of transistors Q23 and Q24, controls the charging rate of capacitor C1, thereby retarding or advancing the triggering of the pulse generator Q22. The rate of conduction of Q23 is dependent on the positive bias at the base of Q24 which, of curse, is in turn dependent on error signal magnitude. The harder Q24 conducts, the harder Q23 conducts and the faster C1 will charge up to the conduction potential of Q22.

The zener diode ZD1 connected across the rate control circuit provides compensation for the spread of saturation voltages which are encountered with replacement of operational amplifiers 10. Thus, the potential of diode ZD1 is selected so as to order the maximum pulse repetition rate, i.e., command that the motor be turned full on, when the magnitude of the error signal exceeds a preselected level.

The signal generated by pulse generator Q22, as a result of the action of the pulse rate control circuit comprising transistors Q23 and Q24, will be a pulsating voltage having a pulse repetition rate proportional to error signal magnitude. These pulses are applied to the pulse shaping circuit 30 which comprises a bistable multivibrator circuit including transistors Q7 and Q8. The pulses from transistor Q22 are applied to the base of transistor Q8 as the set pulses for the flip-flop.

The pulse width control circuit comprises a second pulse generator in the form of unijunction transistor Q6 and its control transistor Q5. The error signal appearing at the base of rate control transistor Q24 is also applied to the base of width control transistor Q5. Q5 controls the charging rate of capacitor C2 thereby retarding or advancing the triggering of pulse generator Q6. The output of transistor Q6 will be a pulse rate which is inversely proportional to error signal magnitude because positive error signals turn Q5 on; the greater the magnitude of the error the harder Q5 will conduct. Conduction of Q5 will shunt current away from C2 thereby slowing its charging rate and slowing the firing rate of Q6. The output signal of the pulse width control circuit, in the form of the pulse train generated by Q6, is applied to the base of transistor Q7 in pulse shaping circuit 30 and functions as the reset signals for the flip-flop.

It is to be noted that the collector of transistor Q8 of pulse shaping circuit 30 is coupled, via diode D4, to the base of pulse generator Q6. Diode D4 functions as a synchronization circuit whereby the set and reset pulses applied to the flip-flop are synchronized. Thus, when the flip-flop has been reset, diode D4 will clamp the emitter of Q6 to substantially ground via Q8 until such time as the flip-flop is set again by an output pulse from transistor Q22. Accordingly, since C2 cannot charge until Q8 has again been set, Q6 cannot fire and produce a reset pulse until after generation of a set pulse.

The motor speed control pulses are measured at the collector of transistor Q8 of the flip-flop comprising pulse shaping circuit 30. In terms of actual control of the motor, the set pulses provided by pulse generator Q22 are commensurate with energization and the reset pulses provided by pulse generator Q6 are commensurate with deenergization. Accordingly, the setting and resetting of the flip-flop comprising pulse shaping circuit 30 results in the generation of an output signal comprising pulses whose width (motor "on time") is proportional to the magnitude of the error signal. The combined variation of motor "on time" and pulse repetition rate will accurately determine motor speed. Considering the conditions where a large error signal, regardless of polarity, is present at the output of amplifier 10, Q22 will be pulsed very rapidly thus providing a series of set pulses to the base of multivibrator transistor Q8. However, with a large error signal, Q5 will be hard on and will prevent charging of C2. Accordingly, Q6 will not supply a reset pulse to the pulse shaping circuit, the motor will be turned full on and, in the manner to be described below, will operate in the proper direction to null the error signal as rapidly as possible. As the error is reduced, Q6 will begin to periodically fire, the firing of Q6 being synchronized with the setting of the flip-flop by the above-described action of diode D4, and both the pulse width and repetition rate of the control signal will vary with the magnitude of the error. As the error decreases, the frequency of firing of Q6 will increase and thus the width of the control pulses will vary directly with error. The output frequency of pulse generator Q22 will also vary directly with error magnitude, smaller error being commensurate with lower pulse repetition rate, and accordingly the pulse repetition rate of the motor control signals will also vary directly with error magnitude.

The output of pulse shaping circuit 30, as taken from the collector of transistor Q8, is applied to the bases of input transistors Q9 and Q18 in the clockwise and counterclockwise drive circuits. The drive circuit input transistors Q9 and Q18 function as emitter followers and, depending upon the state of the respective clamp circuits 20 and 22, deliver speed control signals to the bases of respective driver transistors Q11 and Q16. As previously noted, the clamping transistors Q10 and Q17, respectively in clamp circuits 20 and 22, are operated by their respective level detectors. With the output signals of both level detectors in the nonconductive state, indicating that the error signal if any is within the deadband, both of clamping transistors Q10 and Q17 will be conductive and the bases of the driver transistors Q11 and Q16 will be clamped to ground. As the error signal increases in either direction, one of the clamp transistors will be turned off thereby coupling the pulsating control signal to the driver transistor associated with the nonconductive clamping transistor. Conduction of either of driver transistors Q11 or Q16 will draw current through respective solenoids 44 and 46 thereby closing the associated relay contacts. Closing of the contacts of either of solenoids 44 or 46 will, in turn, turn on the appropriate pair of motor switching rectifiers, SCR 12 and SCR 13 or SCR 14 and SCR 15. The motor switching circuit operates so as to deliver current from the AC source 35 to either of motor field coils 48 and 50. Current will be delivered to field coil 48 via the circuit comprising SCR 12 and SCR 13 while current will be delivered to field coil 50 via SCR 14 and SCR 15. It is to be noted that Triacs could be employed in place of the pairs of SCR's.

To summarize the present invention, a completely solid state controller for electrically driven actuators has been provided. The present invention permits exercise of control over motor speed, direction, position and load braking and the motor may be operated manually or automatically. A particularly novel feature of the present invention is the control of motor speed by acting on two variables, pulse width and repetition rate, simultaneously. The primary variable is pulse width control which determines the "on time" of the motor for any given pulse while the secondary variable is pulse repetition rate which increases the frequency of pulse sampling, typically over a 10:1 range. Control of the secondary variable enables variation of motor "on time" from 4 to 90 percent.

Among the advantageous results achieved through the use of the present invention is the attainment of smooth speed control over a range of about 100 to 1; such control being permitted by the mechanical inertia of the rotating mass integrating the "on" pulse time with the "off" coasting time. Also, there is no loss of torque in the present invention because normal operating voltages are applied to the motor. Accordingly, the present invention retains the motor's normal speed versus torque characteristics.

Through the incorporation of the brake control, the brake locks the actuator (motor) when the system error is within the preselected deadband, presuming automatic control, or when there is a power failure. On manual control, the brake locks the actuator each time the motor is deenergized thereby permitting very small incremental movements of the motor when under manual control.

While a preferred embodiment of the present invention has been described by way of illustration, various modifications and substitutions may be made thereto without departing from the spirit and scope of the invention. Thus, while the system illustrated is for a two-phase motor using capacitor phase shift and bidirectional operation, three-phase motors may easily be controlled by the present invention by appropriate coupling of the driver circuits 32 and 34 to three-phase power switching stages. Also, for unidirectional control, level detector 14, clamp circuit 22 and drive circuit 34 may be omitted. Similarly, the entire brake control circuit 38 may be omitted if overrunning loads are not expected. Accordingly, it is to be understood that the present invention has been described by way of illustration and not limitation.

What is claimed is:

1. Apparatus for controlling an electrical actuator comprising:
   means responsive to input signals commensurate with actual and desired actuator position for generating an error signal;
   bistable switch means;
   first pulse generator means responsive to said error signal for generating first switch control signals having a repetition rate directly proportional to the magnitude of the error signal;
   second pulse generator means responsive to said error signal for generating second switch control signals having a repetition rate inversely proportional to the magnitude of the error signal;
   means applying said first and second switch control signals to said bistable switch means, said first switch control signals causing said switch means to assume a first condition whereby actuator control pulses are initiated and said second switch control signals causing said switch means to assume a second condition whereby previously initiated actuator control pulses will be terminated, the width and repetition rate of the control pulses provided by said bistable switch means thereby varying directly with the magnitude of the error signal;
   a source of power for the actuator to be controlled; and
   means connected to said bistable switch means and to said power source and responsive to the control pulses provided by said switch means for applying power from said source to the actuator.

2. The apparatus of claim 1 further comprising:
   synchronizing means responsive to the condition of said bistable switch means for preventing application of said second switch control signals to said switch means when said switch means is in said second condition.

3. The apparatus of claim 2 wherein the actuator is a bidirectional device having at least a pair of directional control terminals and wherein said means for applying control signal pulses to said actuator comprises:
   means responsive to said error signals for generating directional control signals commensurate with the direction of the actuator position error;

first and second power switch means for applying power from said source to respective of said actuator directional control terminals, said power switch means being responsive to said first and second switch control signals; and means responsive to said directional control signals for applying said switch control signals to the one of said power switch means commensurate with operation of said actuator in the proper direction to null the position error.

4. The apparatus of claim 3 wherein said actuator has an electrically operated brake, said control apparatus further comprising:

a brake control circuit; and means responsive to said directional control signals for generating brake control signals, application of said brake control signals to said brake control circuit causing release of the brake when the error signal exceeds a predetermined magnitude.

5. The apparatus of claim 3 wherein said means for generating directional control signals comprises:

first level detector means for generating a first directional control signal when the error signal exceeds a preselected magnitude; and second level detector means for generating a second directional control signal when the error signal is less than a preselected magnitude, said first and second directional control signals being respectively commensurate with position errors of opposite polarity.

6. The apparatus of claim 4 wherein said means for generating directional control signals comprises:

first level detector means for generating a first directional control signal when the error signal exceeds a preselected magnitude; and second level detector means for generating a second directional control signal when the error signal is less than a preselected magnitude, said first and second directional control signals being respectively commensurate with position errors of opposite polarity.

7. The apparatus of claim 6 wherein the control signals provided by said first and second level detector means are offset from one another to establish a deadband, said brake control signal generating means providing a brake energizing control signal to said brake control circuit when the error signal is within said deadband.

8. The apparatus of claim 7 further comprising:

means responsive to the output of said brake control signal generating means for disabling said first pulse generator means when said brake is in the energized state.

9. The apparatus of claim 1 wherein said bistable switch means comprises:

a bistable multivibrator circuit.

10. The apparatus of claim 9 wherein said first and second pulse generator means each comprise:

an oscillator circuit including an input capacitor; and means responsive to the magnitude of the error signal for varying the charging rate of the input capacitor of said oscillator circuit.

11. The apparatus of claim 5 wherein said bistable switch means comprises:

a bistable multivibrator circuit.

12. The apparatus of claim 11 wherein said first and second pulse generator means each comprise:

an oscillator circuit including an input capacitor; and means responsive to the magnitude of the error signal for varying the changing rate of the input capacitor of said oscillator circuit.

13. Apparatus for controlling a bidirectional electrical actuator, said actuator having at least a pair of directional control terminals, said control apparatus comprising:

means responsive to input signals commensurate with actual and desired actuator position for generating an error signal;

means responsive to said error signal for generating directional control signals commensurate with the direction of the actuator position error;

means responsive to said error signal for generating a pulsating control signal, the width and repetition rate of the pulses comprising said control signal varying directly with the magnitude of the error signal;

a source of power for the actuator to be controlled;

first and second power switch means for applying power from said source to respective of said actuator directional control terminals, said power switch means being responsive to said pulsating control signals; and means responsive to said directional control signals for applying said pulsating control signals to the one of said power switch means commensurate with operation of said actuator in the proper direction to null the position error.

14. The apparatus of claim 13 wherein said means for generating directional control signals comprises:

first level detector means for generating a first directional control signal when the error signal exceeds a preselected magnitude; and second level detector means for generating a second directional control signal when the error signal is less than a preselected magnitude, said first and second directional control signals being respectively commensurate with position errors of opposite polarity.

15. Apparatus for controlling an electrical actuator, said actuator having an electrically operated brake, said control apparatus comprising:

means responsive to input signals commensurate with actual and desired actuator position for generating an error signal;

means responsive to said error signal for generating a pulsating control signal, the width and repetition rate of the pulses comprising said control signal varying directly with the magnitude of the error signal;

a source of power for the actuator to be controlled;

means responsive to said control signal pulses for applying power from said source to the actuator;

a brake control circuit; and means responsive to the magnitude of said error signal for generating brake control signals, said brake control signals being applied to said brake control circuit and causing release of the brake when the error signal exceeds a predetermined magnitude.

* * * * *